Aug. 9, 1932.  O. C. BREWSTER  1,871,148
ART OF DISTILLATION OF HYDROCARBON OILS
Filed June 8, 1925
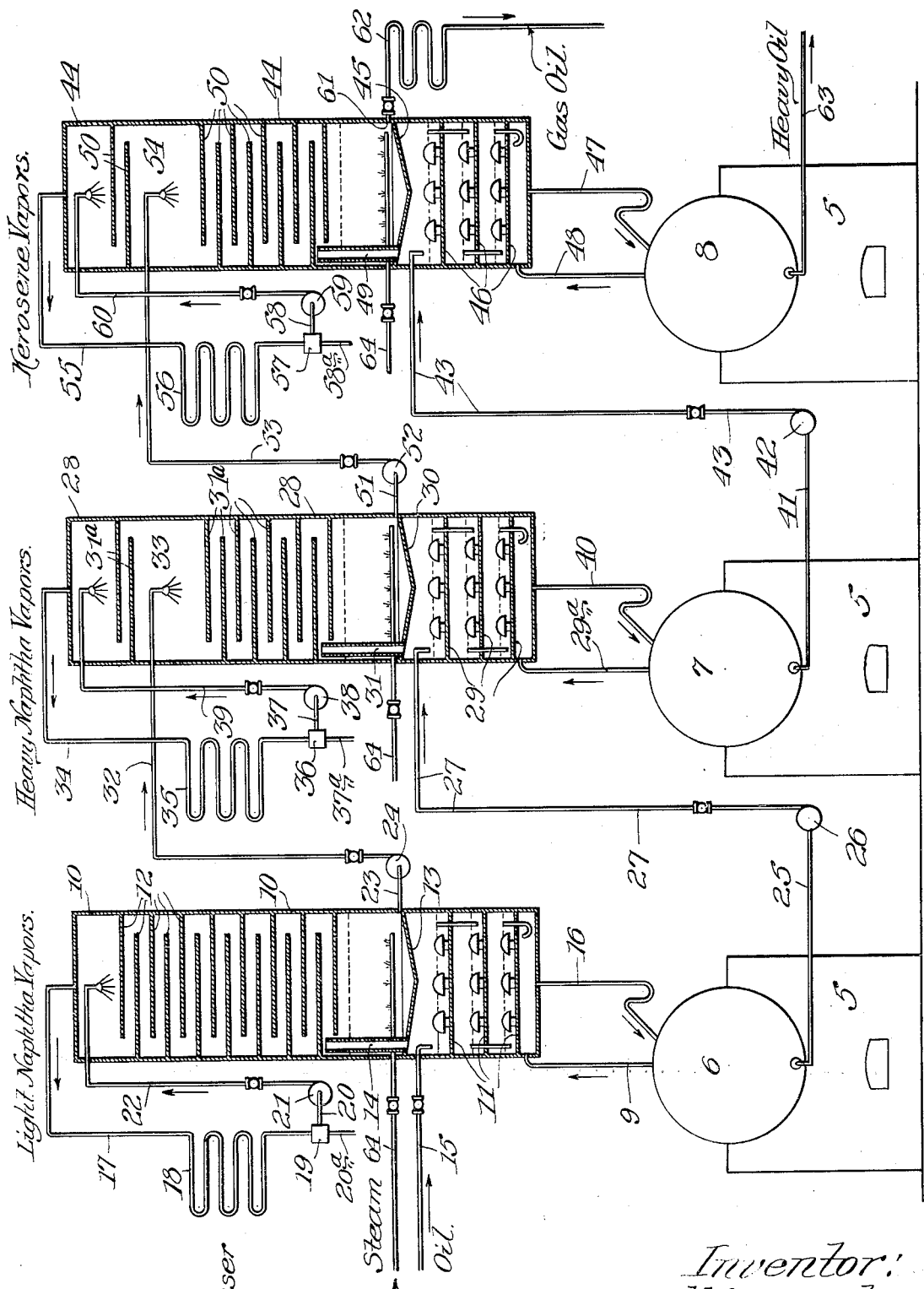
Inventor:
Oswald C. Brewster,
By Dyrenforth, Lee, Chritton & Wiles
Att'ys Patented Aug. 9, 1932

1,871,148

UNITED STATES PATENT OFFICE

OSWALD C. BREWSTER, OF CASPER, WYOMING, ASSIGNOR TO STANDARD OIL COMPANY, OF WHITING, INDIANA, A CORPORATION OF INDIANA

ART OF DISTILLATION OF HYDROCARBON OILS

Application filed June 8, 1925. Serial No. 35,640.

The present invention relates to improvements in the art of distilling hydrocarbon oils, and will be fully understood from the following description, illustrated by the accompanying drawing, in which apparatus suitable for carrying the invention into effect is diagrammatically illustrated.

Referring to the drawing, the numeral 5 indicates still settings in which are mounted the stills 6, 7 and 8 illustrated as of the shell or horizontal cylindrical type. From the still 6 a vapor line 9 leads to the lower portion of a fractionating tower 10, in the lower portion of which are provided a plurality of fractionating or exhausting plates 11, illustrated as of the bubble plate type. In the upper portion of the fractionating tower 10 there are also provided a plurality of fractionating plates 12 of any desired type. In a space provided in the tower between the plates 11 and 12, there is mounted a collecting pan 13, provided with a vapor conduit 14 for leading vapors from below the collecting pan 13 into the portion of the tower occupied by the plates 12. An oil supply line 15 leads oil into the tower below the collecting pan 13. Reflux from the lower portion of the tower, together with the unvaporized portions of the feed supplied through the line 15 are conducted through the reflux return line 16 back to the still 6.

Vapors uncondensed in the upper portion of the tower 10 pass out through the vapor line 17 to the condenser 18 and the receiver 19 provided with draw-off lines 20 and 20$^a$. Condensate may be withdrawn from the receiver 19 through the line 20 by the pump 21 and forced through line 22 back into the upper portion of the tower 10 to provide a cooling means therein. Reflux from the collecting pan 13 is withdrawn through the line 23 by pump 24 and disposed of as hereinafter set forth.

Unvaporized oil or bottoms from the still 6 are withdrawn through line 25 by pump 26 or other suitable means and forced through line 27 into the lower portion of a fractionating tower 28, which receives vapors through line 29$^a$ from the still 7. The fractionating tower 28 is of construction similar to that of tower 10, being provided in its lower portion with a plurality of fractionating or exhausting plates 29, suitably of the bubble plate type, and above these exhausting plates with a reflux collecting pan 30 having a conduit 31 for the passage of vapors from the lower portion of the tower to the upper portion thereof. The line 27 discharges into the tower 28 below the reflux collecting pan 30.

Above the reflux collecting pan 30, there are provided in the tower 28 a plurality of fractionating plates 31$^a$. Reflux withdrawn from the collecting pan 13 of tower 10 is forced through the line 32 into a space 33 provided at a suitable point between plates 31$^a$ in the upper portion at a suitable point, the plates above this point preventing entrainment of liquid by vapors issuing from the tower. Vapors from the tower 28 pass out through line 34 to condenser 35 and the condensate passes into the receiver 36 having draw off lines 37 and 37$^a$. Portions of condensate may be withdrawn through the line 37 by pump 38 and forced through line 39 into the upper portion of the tower in the manner already described in connection with the return of condensate to the tower 10. A return line 40 is provided from the lower portion of the tower 28 for the return of reflux and unvaporized oil to the still 7.

Bottoms or tar from the still 7 is withdrawn through the line 41 by pump 42 and forced through line 43 into the lower portion of the tower 44, the construction of which is similar to that of the tower 28. The bottoms from still 7 discharge into the lower portion of the tower 44 below the reflux collecting pan 45 into the space occupied by the fractionating or exhausting plates 46, and unvaporized oil, together with reflux formed in this portion of the column 44 is conducted through line 47 into the still 8. Vapors from the still 8 pass through line 48 into the lower portion of the tower 44. A vapor conduit 49 conducts vapors from the portion of the tower 44 below the pan 45 to the portion thereabove which contains the fractionating plates 50. Reflux from the collecting pan 30 of the tower 28 is withdrawn through line 51 by pump 52 and forced through line 53 into an intermediate space 54 provided between plates 50 at a suitable point in the tower 44. Vapors from the top of the tower pass out through line 55 to condenser 56 and condensate from the latter passes to receiver 57, provided with draw-off lines 58 and 58ª. A portion of the condensate may be withdrawn from receiver 57 through line 58 by pump 59 and forced back through line 60 to the upper portion of the tower 44. In the form of construction illustrated, in which the still 8 is indicated as the last still of a battery, reflux collected in the pan 45 of the tower 44 connected to that still is discharged through line 61 to cooler 62. Bottoms from still 8 pass out through the line 63.

Steam lines 64 are provided for the supply of steam to the body of reflux collected on the pans 13, 30 and 45 of the towers 10, 28 and 44 respectively.

The operation may be described as carried out upon a feed stock containing, as constituents to be separated, light naphtha, heavy naphtha, kerosene, gas oil, and a wax bearing oil forming the tar or bottoms. The feed stock is fed through the line 15 into the portion of the tower 10 below the collecting pan 13, and descends through the portion of the tower occupied by the exhausting plates 11 countercurrent to vapors rising from the heated body of oil in the still 6. The feed is thereby preheated, and causes the heavier portions of the vapor to be condensed and returned to the still with the preheated feed through the line 16. Vapors uncondensed in this portion of the column pass through the conduit 14 into the upper portion of the column, and pass upwardly through the part of the column occupied by the fractionating plates 12. A suitable cooling medium is provided in this portion of the column by the return through the line 22 of a portion of distillate or condensate from the vapors issuing from the column through the line 17. It is obvious that other suitable cooling means, for example, indirect cooling coils, or an independent reflux cooler may be employed for a like purpose.

The supply of cooling medium is controlled so that the vapors issuing from the tower through the line 17 consist only of the lightest constituent to be recovered; in the case described, the light naphtha. The reflux formed in the upper part of the column 10 and collected on the pan 13 will comprise essentially a small proportion of the lightest or first products, light naphtha, a preponderant proportion of the next lightest or the second product (heavy naphtha) and small proportions of the third product or kerosene. Steam is supplied into the body of reflux collected on this plate through the steam line 64 in quantity sufficient to strip from the reflux its content of the lightest or first product, light naphtha. The residue in the still 6 has been deprived of all of its light naphtha constituent, of a large portion of its heavy naphtha and of a small portion of its kerosene. This residue is withdrawn continuously through the line 25 and supplied as feed stock to the line 27 to the portion of the tower 28 below the reflux collecting pan 30, this tower being connected to the second still 7. The reflux collected on the pan 13, which, after stripping of its light naphtha by steam, consists essentially of a preponderant proportion of heavy naphtha and a smaller proportion of kerosene, is supplied to the upper portion of the tower 28 at or near its top.

The stock supplied through line 27 to the lower portion of column 28 passes countercurrent to ascending vapors rising from the still 7 through the vapor line 29, some light portions thereof being vaporized, while some heavy portions of the vapors from still 7 are condensed and returned with the stock fed in through the line 40. Vapors from the lower portion of the column pass through vapor conduits 31 into the upper portion of the column, through which they rise countercurrent to the descending reflux liquid supplied from the reflux collecting pan 13 of the column 10. This reflux liquid is supplied to the column 28 preferably somewhat below the top, so that the plates 31ª above the point of its admission will prevent entrainment of unvaporized liquid in the vapors passing out through the line 34 to the condenser. Additional cooling action, if required, may be secured, for example, by return of condensate through the line 39. The vapors passing out of the tower 28 through the line 34 consists substantially entirely of heavy naphtha. The reflux collected on the pan 30 in this tower contains a small proportion of the heavy naphtha, a preponderant proportion of kerosene, and a small proportion of gas oil. By the introduction of steam through the line 64 into the body of reflux collected on the pan 30, the heavy naphtha is stripped therefrom, leaving a residual reflux comprising substantially only kerosene and a small proportion of gas oil. The residue in the still 7, which is continuously withdrawn, has been striped of all of the light and heavy naphthas contained therein, and of a part of the kerosene and gas oil contents. This residue is withdrawn continuously through line 41 and forced through line 43 into the lower portion of the column 44, which receives vapors through line 48 from still 8. The action taking place in the lower portion of this column is similar to that taking place in the lower portions of the preceeding columns. Vapors rise from the lower portion of the column through the conduit 49 into the upper portion of the column 44, to which residual reflux from the collecting pan 30 of column 28 is supplied through line 53 continuously, in the same manner as described in connection with the corresponding action taking place in column 28. Similarly, additional cooling may be secured in this column by the return of condensate through the line 60. The operation of this column is conducted so that the vapors passing out through the line 55 consist entirely of kerosene fractions. The reflux formed and collected in the pan 45 of this column contains small porportions of kerosene and a larger, preponderant proportion of gas oil. The kerosene fractions are stripped from this reflux by the injection of steam through the line 64, leaving a residual reflux consisting of a gas oil not requiring further rectification. The residual product in the still 8, which is withdrawn continuously through the line 63, is the wax containing, heavy end of the oil.

Although the invention has been described above in connection with an operation including the use of three stills in succession for the separation of five designated products, it will be clearly apparent that the invention may be embodied in operations involving the use of a greater or less number of stills and the separation of a greater or less number of products of varying characteristics. It will be noted that in the operation herein set forth, the amount of vaporization which must be affected in the still is very greatly reduced below that occurring in continuous operations as hitherto carried out; and furthermore, the reflux ratios in the fractioning towers are very substantially reduced, permitting of substantial reduction in the size of towers required for handling given quantities of products or for greatly increasing the quantity of product which can be handled by a tower of a given size.

It is to be understood that the specific details of apparatus and method hereinbefore set forth are for the purpose of illustration, and are not intended to be regarded as limitations upon the scope of the claims, except as contained in the following claims.

I claim:

1. In apparatus for the distillation of hydrocarbon oils, a still, a fractionating tower, means for conducting vapors from the still to the fractionating tower, a reflux collecting means at an intermediate point in said tower, means for returning reflux collected in said tower below the reflux collecting means to the still, a second still, a second fractionating tower, means for conveying vapors from the second still to the second fractionating tower into the lower portion thereof, means for supplying residuum from the first still to the second still, and means for supplying collected reflux from the intermediate portion of the first tower to the upper portion of the second tower.

2. In apparatus for the distillation of hydrocarbon oils, a still, a fractionating tower, means for conducting vapors from the still to the base of the fractionating tower, reflux collecting means at an intermediate point in said tower, means for supplying oil to the tower below the reflux collecting means, means for conveying the oil supplied to the tower with reflux formed in the lower portion thereof to the still, a second still, a second fractionating tower, means for conducting vapors from the second still to the base of the second tower, means for supplying residuum from the first still to the second tower, means for supplying collected reflux from the intermediate point in the first tower to the upper portion of the second tower, and means for conducting reflux and supplied oil from the second tower to the second still.

3. In apparatus for the distillation of hydrocarbon oils, a still, a fractionating tower connected therewith, means for conducting vapors from the still to the base of the fractionating tower, a reflux collecting pan at an intermediate point in said tower, means for supplying oil to said tower below the reflux collecting pan, means for conducting the supplied oil and reflux formed in the tower below the reflux collecting pan from the base of the tower to the still, a second still, a second fractionating tower, means for conducting vapors from the second still to the base of the second fractionating tower, a reflux collecting pan at an intermediate point in said second fractionating tower, means for conveying residuum from the first still to the second fractionating tower at a point therein below the reflux collecting pan, means for supplying collected reflux from the first fractionating tower to the second fractionating tower above the reflux collecting pan in the latter, and means for conveying supplied oil and reflux formed below the reflux collecting pan in the second fractionating tower to the second still.

4. In apparatus for the distillation of hydrocarbon oils, a still, a fractionating tower, means for conducting vapors from the still to the fractionating tower, a reflux collecting means at an intermediate point in said tower, means for distilling light ends from the reflux collected in said reflux-collecting means, means for returning reflux collected in said tower below the reflux collecting means to the still, a second still, a second fractionating tower, means for conveying vapors from the second still to the second fractionating tower into the lower portion thereof, means for supplying residuum from the first still to the second still, and means for supplying reflux from the intermediate portion of the first tower to the upper portion of the second tower.

5. In apparatus for the distillation of hydrocarbon oils, a still, a fractionating tower, means for conducting vapors from the still to the base of the fractionating tower, reflux collecting means at an intermediate point in said tower, means for introducing steam into the reflux collecting means, means for supplying oil to the tower below the reflux collecting means, means for conveying the oil supplied to the tower with reflux formed in the lower portion thereof to the still, a second still, a second fractionating tower, means for conducting vapors from the second still to the base of the second tower, means for supplying residuum from the first still to the second tower, means for supplying collected reflux from the intermediate point in the first tower to the upper portion of the second tower, and means for conducting reflux and supplied oil from the second tower to the second still.

6. The method of distilling hydrocarbon oils comprising heating a body of oil, continuously supplying oil thereto, passing the vapors from said body of oil into a fractionating tower, collecting reflux at an intermediate point in said tower, returning reflux formed below said point of reflux collection to the heated body of oil, withdrawing residual oil from said heated body of oil, forming a second body of oil therefrom, heating said second body of oil, conducting the vapors evolved therefrom into a fractionating tower, and introducing the reflux collected in the first tower into the upper portion of the second tower.

7. The method of distilling hydrocarbon oils comprising heating a body of oil, passing the vapors evolved therefrom into a fractionating tower, collecting reflux at an intermediate point in the tower, returning reflux formed in the tower below the point of reflux collection to the still, removing collected reflux from the fractionating tower and discharging it into the upper portion of a second fractionating tower, collecting reflux at an intermediate point in said second fractionating tower, continuously supplying residuum from the said body of oil to the second fractionating tower below the point of reflux collection therein, conducting the residuum thus supplied, together with reflux formed below the point of reflux collection from the second fractionating tower to a second body of oil, heating said second body of oil, and passing the vapors evolved therefrom into the lower part of the second fractionating tower.

8. The method of distilling hydrocarbon oils comprising heating a body of oil, continuously supplying oil thereto, passing the vapors from said body of oil into a fractionating tower, collecting reflux at an intermediate point in said tower, returning reflux formed below said point of reflux collection to the heated body of oil, withdrawing residual oil from said heated body of oil, forming a second body of oil therefrom, heating said second body of oil, conducting the vapors evolved therefrom into a fractionating tower, introducing the reflux collected in the first tower into the upper portion of the second tower, and passing steam through the bodies of collected reflux in each of the fractionating towers.

9. The method of distilling hydrocarbon oils comprising heating a body of oil, passing the vapors evolved therefrom into a fractionating tower, collecting reflux at an intermediate point in the tower, returning reflux formed in the tower below the point of reflux collection to the still, removing collected reflux from the fractionating tower and discharging it into the upper portion of a second fractionating tower, collecting reflux at an intermediate point in said second fractionating tower, continuously supplying residuum from the said body of oil to the second fractionating tower below the point of reflux collection therein, conducting the residuum thus supplied, together with reflux formed below the point of reflux collection from the second fractionating tower to a second body of oil, heating said second body of oil, passing the vapors evolved therefrom into the lower part of the second fractionating tower, and passing steam through the bodies of collected reflux in each of the fractionating towers.

10. The method of distilling petroleum hydrocarbon oils which comprises heating a body of oil, removing from the heated body of oil the vapors evolved, passing said vapors in contact with additional liquid oil in a tower, whereby some of the vapors are condensed and some of the said liquid oil is vaporized, continuously introducing the unvaporized portion of said liquid oil together with the condensate to said heated body of oil, continuously removing residuum from said heated body of oil, subjecting the remaining vapors in further upward passage through said tower to a fractionating operation in said tower and collecting the condensate therefrom at a point just above that of initial contact of said liquid oil with the vapors, stripping light constituents from said collected condensate with steam within the tower, withdrawing the stripped condensate, separately vaporizing a portion of said withdrawn residuum, and contacting the said stripped condensate withdrawn from said tower with the vapors of said residuum to effect fractionation of said vapors.

OSWALD C. BREWSTER.